United States Patent
Stawicki et al.

(10) Patent No.: US 6,260,875 B1
(45) Date of Patent: Jul. 17, 2001

(54) SEAMLESS/INTEGRAL DSIR OR PSIR DOOR CONFIGURATION IN HARD PLASTIC TRIM APPLICATION FACILITATED BY GAS

(75) Inventors: Edwin V. Stawicki, Highland; Nelson J. Morren, Hudsonville; John J. Kennedy, Royal Oak; Vernon A. Daniels, Brooklyn, all of MI (US)

(73) Assignee: Textron Automotive Company, Dover, NH (US)

( * ) Notice: Subject to any disclaimer, the term of this patent is extended or adjusted under 35 U.S.C. 154(b) by 0 days.

(21) Appl. No.: 09/335,114

(22) Filed: Jun. 11, 1999

Related U.S. Application Data

(60) Provisional application No. 60/089,863, filed on Jun. 19, 1998.

(51) Int. Cl.⁷ .................................................. B60R 21/20
(52) U.S. Cl. .................................. 280/728.3; 280/728.1; 280/732
(58) Field of Search ................................ 280/728.3, 732, 280/731, 728.1

(56) References Cited

U.S. PATENT DOCUMENTS

| | | |
|---|---|---|
| 4,305,644 | 12/1981 | Drlik . |
| 4,842,299 | 6/1989 | Okamura et al. . |
| 5,035,444 | 7/1991 | Carter . |
| 5,112,563 | 5/1992 | Baxi . |
| 5,158,733 | 10/1992 | Trimble . |
| 5,162,092 | 11/1992 | Klobucar et al. . |
| 5,174,932 | 12/1992 | Johnson et al. . |
| 5,277,443 | 1/1994 | Grant et al. . |
| 5,342,085 | 8/1994 | Hirashima et al. . |
| 5,395,668 * | 3/1995 | Ito et al. ............................ 280/728.3 |
| 5,456,487 | 10/1995 | Daris et al. . |
| 5,533,749 * | 7/1996 | Leonard et al. ...................... 280/732 |
| 5,564,731 * | 10/1996 | Gallagher et al. .................... 280/732 |
| 5,569,959 | 10/1996 | Cooper et al. . |
| 5,738,367 | 4/1998 | Zichichi et al. . |

FOREIGN PATENT DOCUMENTS

| | | |
|---|---|---|
| 19735438A1 | 2/1999 | (DE) . |
| 722 863 A1 | 7/1996 | (EP) . |
| 2649945 | 7/1990 | (FR) . |
| 6227351 | 8/1994 | (JP) . |
| 07246900 | 9/1995 | (JP) . |
| 09240404 | 9/1997 | (JP) . |
| WO 9856620 | 12/1998 | (WO) . |

* cited by examiner

*Primary Examiner*—Eric Culbreth
(74) *Attorney, Agent, or Firm*—Reising, Ethington, Barnes, Kisselle, Learman & McCulloch, PC

(57) ABSTRACT

An inflatable restraint assembly for passengers in automotive vehicles including an air bag door integrally formed in an automotive trim of a first material. The integral air bag door is defined at least in part by a tear guide when in a closed position. The air bag door is movable from the closed position to provide a path for an air bag to deploy through. The air bag door is movable out of the closed position by at least partially separating from the trim panel along a door seam at least partially defined by the tear guide. A retaining structure is configured to preclude at least a portion of the air bag door from departing the immediate vicinity of the trim panel during air bag deployment. According to one embodiment a hinge comprising a second material may is embedded at least partially within the first material and spans the door seam. According to another embodiment a tubular channel may be disposed along the tear guide to create a substantial strength differential with the door seam and help confine tearing to the tear guide during air bag deployment

12 Claims, 3 Drawing Sheets

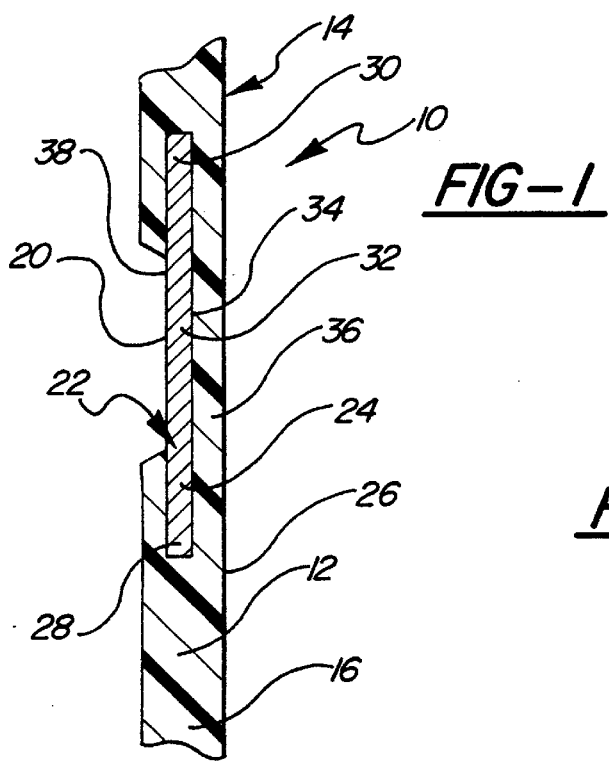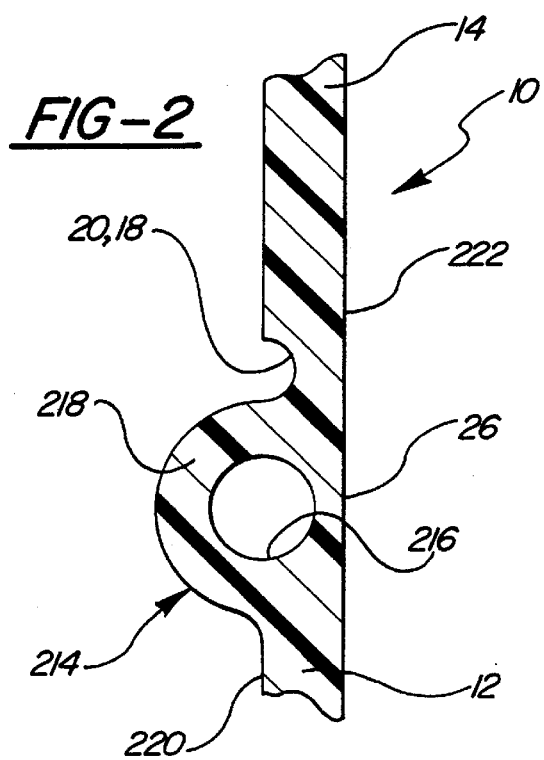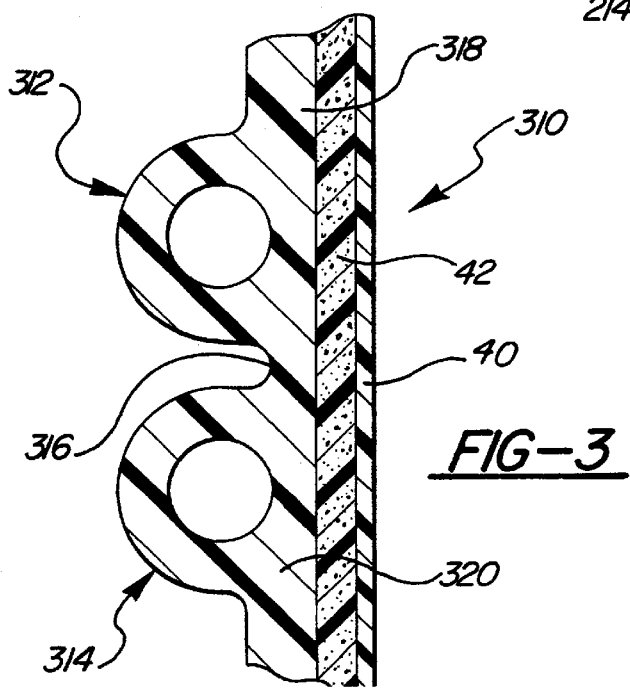

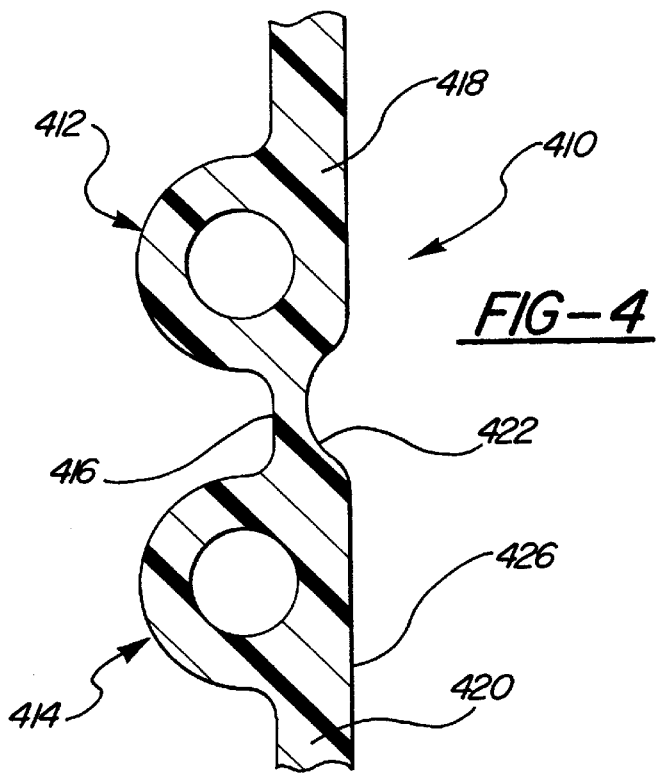
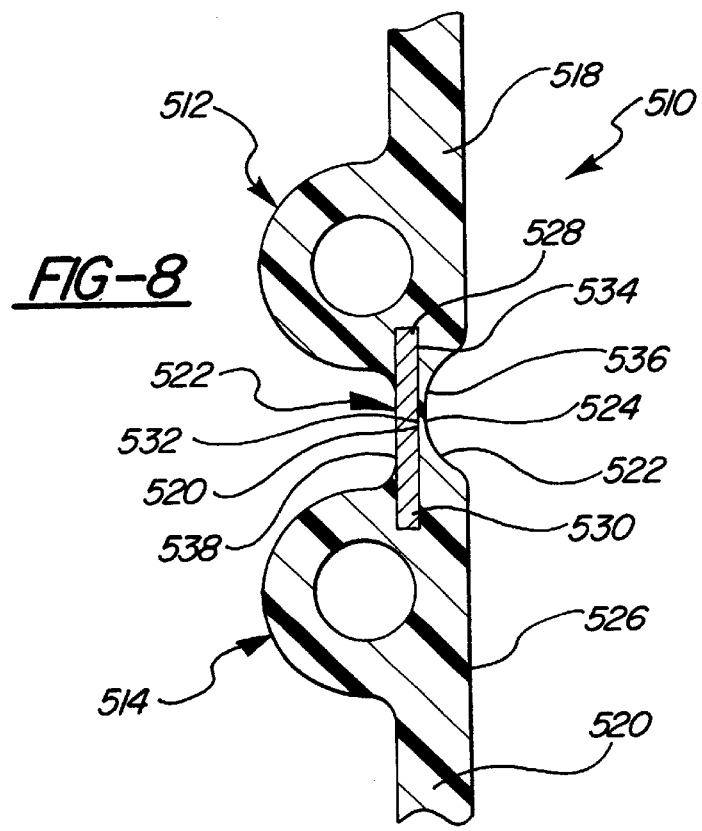

SEAMLESS/INTEGRAL DSIR OR PSIR DOOR CONFIGURATION IN HARD PLASTIC TRIM APPLICATION FACILITATED BY GAS

This application claims priority of U.S. provisional patent application No. 60/089,863 filed Jun. 19, 1998.

TECHNICAL FIELD

This invention relates generally to an air bag door that is integrally formed with a vehicle trim panel, and, more particularly, to such an air bag door configured to break and/or tear open in a predictable way and a method for making such a door.

INVENTION BACKGROUND

It is desirable for inflatable restraint systems having intergrally formed air bag doors to include some means of insuring that the air bag doors break and/or tear open in a generally predictable way. This is true for driver-side inflatable restraint systems (DSIRs), passenger-side inflatable restraint systems (PSIRs) and inflatable restraint systems in vehicle door panels, quarter panels; other sidewall structures, seats, headliners, pillars, etc. The air bag doors in such systems open to provide a path for an air bag to deploy through. It is also desirable for such systems to include means for insuring that portions of the door do not separate from the system when an air bag deploys and forces the door open.

To develop tearing and/or breaking, air bag doors that are integrally formed with automotive trim or instrument panels will sometimes include regions of weakened materials, reduced thickness or scoring, all of which are commonly referred to as "tear seams." Tear seams are weak areas designed to tear and/or break when an air bag inflates and forces the door to open. Some of these systems also employ tethers and/or hinges that retain the air bag door to the instrument or trim panel after the door has torn and/or broken open. For example, U.S. Pat. No. 5,569,959, issued to Cooper et al., discloses an inflatable restraint assembly comprising an air bag door retainer portion integrally formed in an automotive instrument panel retainer and defined by a door seam. A tear guide is included in a skin cover disposed over a foam layer that extends across the door opening. A metal hinge panel is embedded within the instrument panel retainer and spans a portion of the door seam. Cooper et al. also disclose a method for making such an inflatable restraint assembly. The method includes premolding the hinge panel into the hard instrument panel retainer portion such that the hinge panel spans the door seam.

With many current systems, the tear seams and/or hinges are formed in a hard instrument panel retainer portion. They may be created during molding or can be done by a secondary operation such as cutting, grinding or laser scoring performed after a manufacturing step of integrally molding the instrument panel and door. Current systems also include tear seams formed in back surfaces opposite the outer class-A surfaces of integral instrument panel/air bag door structures to improve the aesthetic appearance of the instrument panel by concealing the presence of the door.

To date, most tear seams formed in hard instrument panel retainers during molding are created via a reduced thickness of material. However, this method has proven unreliable where the structure of one side of the tear seam is limited to the nominal thickness of the panel. In such an instance the tearing action tends to leave the path of the intended seam which is unacceptable. Consequently, secondary operations are often used to increase the repeatability and robustness of the tear seam which has the negative impact of cutting cost.

At least one automotive instrument panel, as shown and described in U.S. Pat. No. 5,162,092, issued to Klobucar et al., discloses an instrument panel having a gas channel and a method for forming the channel in the panel. The gas channel is a tubular structure integrally formed in the panel by injecting gas into molten panel material in a mold. The gas channel in the Klobucar et al. instrument panel adds structural rigidity. However, Klobucar et al. does not disclose an air bag door or any other supplemental inflatable restraint component.

What is needed is a supplemental inflatable restraint system that includes an integrally formed air bag door having retaining structure that retains the door during air bag deployment and that can be formed with the air bag door instead of requiring a secondary operation. What is also needed is such a system that includes tear-guiding structure that guides tearing during air bag deployment and that can be formed with the air bag door instead of requiring a secondary operation.

INVENTORY SUMMARY

According to the present invention an inflatable restraint assembly is provided for passengers in automotive vehicles that includes a hinge comprising a first material and a second material embedded at least partially within the first material and spanning a door seam. The assembly also includes an air bag door integrally formed in an automotive instrument panel comprising the first material. The integral air bag door is defined at least in part by a tear guide when the door is in a closed position. The air bag door is movable from the closed position to provide a path for an air bag to deploy through and is movable out of the closed position by at least partially separating from the instrument panel along a door seam at least partially defined by the tear guide. A retaining structure is configured to preclude at least a portion of the air bag door from departing the immediate vicinity of the instrument panel during air bag deployment.

According to another aspect of the invention the hinge is configured to be at least substantially invisible as viewed from the outer class-A surface of the instrument panel. This improves the aesthetic appearance of the class-A surface and discourages tampering.

According to another aspect of the invention the hinge includes a first end embedded in a portion of the first material that forms the door and a second end embedded in a portion of the first material that forms the instrument panel. A mid portion of the hinge is disposed between the first and second ends and has an outer surface covered with a portion of the first material that forms the outer class-A surface of the door and instrument panel. The mid portion also has an exposed inner surface disposed opposite the outer surface that is not covered with the first material.

According to another aspect of the invention the second material includes any one or more materials from a group of materials including thermoplastic rubber, glass matte, fabric and metal According to another aspect of the invention a skin layer is supported on the trim panel and a foam layer may be disposed between the trim panel and the skin layer.

According to another aspect of the invention, the trim panel includes a second generally tubular channel disposed generally parallel to the first tubular channel and along a side of the hinge opposite the first tubular channel.

According to another aspect of the invention the tear guide comprises a region of reduced strength that guides tearing during air bag deployment. A first generally tubular channel is disposed along the tear guide to create a substantial strength differential with the door seam. This helps to insure that tearing and breakage is confined to the tear seam.

According to another aspect of the invention the first tubular channel includes an elongated arcuate outer wall. The arcuate outer wall includes no sharp edges.

According to another aspect of the invention the tear guide comprises a region of reduced thickness. Reducing thickness allows strength to be reduced without incorporating a second, weaker material.

According to another aspect of the invention the first tubular channel is disposed opposite an outer class-A surface of the air bag door and instrument panel. Again, this helps preserve the aesthetic appearance of the outer class-A surface of the air bag door and instrument panel According to another aspect of the invention a second generally tubular is disposed adjacent and parallel to the first tubular channel, the tear guide being disposed between the first and second tubular channels.

According to another aspect of the invention the tear guide is defined by an elongated gap disposed between the first and second tubular channels. In other words, the gap itself serves as a tear guide obviating the need to form a separate tear guide such as a groove or a series of apertures.

According to another aspect of the invention an elongated groove is disposed in the outer class-A surface opposite the elongated gap. The groove enhances the ability of the tear guide to prevent tears from propagating outside the tear guide.

According to another aspect of the invention a method is provided for making an inflatable restraint assembly for passengers in automotive vehicles. The method includes providing a mold configured to form the shape of the integral air bag door and instrument panel and inserting a sheet of the second material into the mold in a position spanning a region of the mold configured to form the door seam. The first material is introduced in molten form into the mold such that the sheet of the second material is at least partially embedded in the first material. The first material is allowed to cure within the mold and the cured first material and at least partially embedded sheet of the second material are removed from the mold.

According to another aspect of the invention a second method is provided for making an inflatable restraint assembly for passengers in automotive vehicles. The second method includes providing a mold configured to form the shape of the integral air bag door and instrument panel and the tubular channel and providing resin in the mold Gas is injected into a portion of the resin that is disposed in a portion of the mold configured to form the tubular channel. The resin is then allowed to cure within the mold and is removed from the mold.

BRIEF DRAWING DESCRIPTION

To better understand and appreciate the invention, refer to the following detailed description in connection with the accompanying drawings:

FIG. 1 is a cross-sectional view of a hinge constructed according to the present invention;

FIG. 2 is a cross-sectional view of a break-away/tear seam of a first embodiment of an integral air bag door and instrument panel constructed according to the invention;

FIG. 3 is a cross-sectional view of a break-away/tear seam of a second embodiment of an integral air bag door and instrument panel constructed according to the invention;

FIG. 4 is a cross-sectional view of a break-away/tear seam of a third embodiment of an integral air bag door and instrument panel constructed according to the invention;

FIG. 8 is a cross-sectional view of a hinge constructed according to a fourth embodiment of the invention.

DESCRIPTION OF PREFERRED INVENTION EMBODIMENTS

Figure 5:
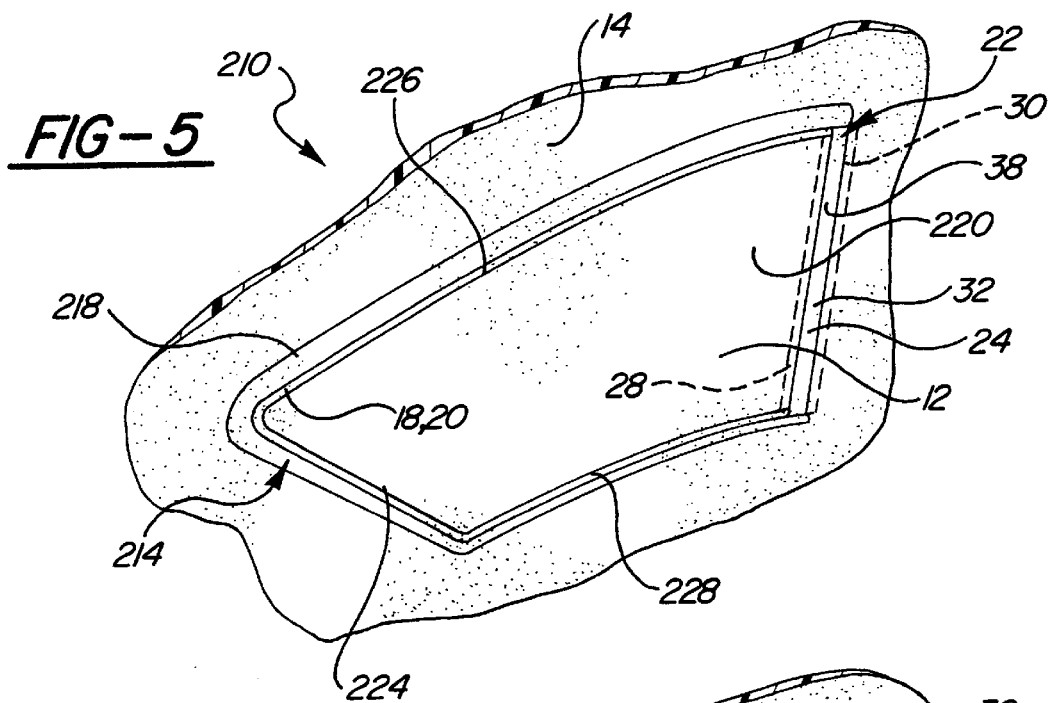
FIG. 5 is a partial perspective bottom view of the integral air bag door and instrument panel of FIG. 2.

A first embodiment of an inflatable restraint assembly for passengers in automotive vehicles constructed according to the present invention is generally shown at 10 in FIGS. 1, 2 and 5. Second, third and fourth embodiments of the invention are shown at 310 in FIGS. 3 and 6, at 410 in FIGS. 4 and 7, and at 510 in FIG. 8; respectively.

FIGS. 1, 2 and 5 show the closed position of an air bag door 12 integrally formed in an automotive instrument panel 14 according to the first embodiment. The composite air bag door 12 and instrument panel 14 comprise a first plastic material 16 and includes a tear guide 18 that defines the air bag door 12. The tear guide 18 is constructed to insure that the air bag door 12 breaks and/or tears open in a generally predictable way. The air bag door 12 is movable from the closed position to provide a path for an air bag to deploy through. The air bag door 12 is movable out of the closed position by causing the air bag door 12 to at least partially separate from the instrument panel 14 along a door seam 20 that is at least partially defined by the tear guide 18. The remainder of the door seam 20 is defined by an integral retaining structure in the form of a hinge 22. The hinge 22 is configured to preclude at least a portion of the air bag door 12 from departing the immediate vicinity of the instrument panel 14 during air bag deployment. The immediate vicinity of the instrument panel 14 is an area surrounding the instrument panel 14 that is spaced far enough from any passenger compartment occupant that no portion of the air bag door 12 can contact an occupant during air bag deployment. The hinge 22 allows the air bag door 12 to open when the air bag inflates but insures that the door 12 does not separate under the force of air bag deployment. The hinge 22 includes a hinge panel 24 comprising a second material that is embedded at least partially within the first material 16 and spans the door seam 20. The second material may include any one or more of a number of suitable materials to include a thermoplastic rubber such as Santoprene@, glass matte, cloth or fabric and metal.

The hinge panel 24 is invisible as viewed from an outer class-A surface 26 of the instrument panel 14. A first end 28 of the hinge panel 26 is embedded in a portion of the first material 16 that forms the door 12. A second end 30 of the hinge panel 26 is embedded in a portion of the first material 16 that forms the instrument panel 14. A mid portion 32 of the hinge panel 24 is disposed between the first and second ends 28, 30. The mid portion 32 of the hinge panel 26 has a hinge panel outer surface 34 covered with a portion 36 of the first material 16 that forms the outer class-A surface of the door 12 and instrument panel 14. The portion 36 of the first material that covers the outer surface 34 of the mid portion 32 of the hinge panel 24 continues the outer class-A surface 26 over the hinge panel 24 and between the door 12 and instrument panel 14, concealing the presence of the hinge panel 14 and the dividing line or seam 20 between the door 12 and instrument panel 14. The mid portion 32 also has an exposed hinge panel inner surface 38 disposed opposite the hinge panel outer surface 34. The hinge panel inner surface 38 is left exposed to promote bending along the hinge.

As shown in FIGS. 2 and 5, the tear guide 18 comprises a region of reduced thickness outlining the integral air bag door 12 in the instrument panel retainer 14. The tear guide 18 guides tearing and/or breakage during air bag deployment. In addition, a generally tubular channel 214, sometimes referred to as a gas structural channel, is disposed on the air bag door 12 along the tear guide 18. The tubular channel 214 comprises a tube 216 having a generally circular cross-section. The tube 216 is partially defined by an elongated arcuate wall 218 that integrally extends from an inner surface 220 of the air bag door 12. The arcuate wall 218 and the air bag door 12 and the instrument panel 14 are formed together as a single unitary piece by gas-assisted injection molding as is described in greater detail below. The gas channel 214 provides reinforcement and structure that creates a substantial strength differential with the door seam 20. The channel 214 may, in other embodiments, be at least partially filled with a lower density core rather than being hollow.

In other embodiments, the tubular channel 214 may have a tubular cross section that is other than circular and may extend integrally from the instrument panel 14 rather than the air bag door 12. In either case, the tubular channel 214 is disposed opposite an outer class-A surface 222 of the air bag door 12 and instrument panel 14. In this position the gas channel 214 is hidden from vehicle occupants' view and helps to conceal the presence of the supplemental inflatable restraint system. As shown in FIG. 5, the channel 214 extends around a rear edge 224 and side edges 226, 228 of the air bag door 213. While a single "C-formed" door is shown in FIG. 5, the same approach can be used for "H-shaped" double doors, "X-shaped" doors, etc.

Figure 6:
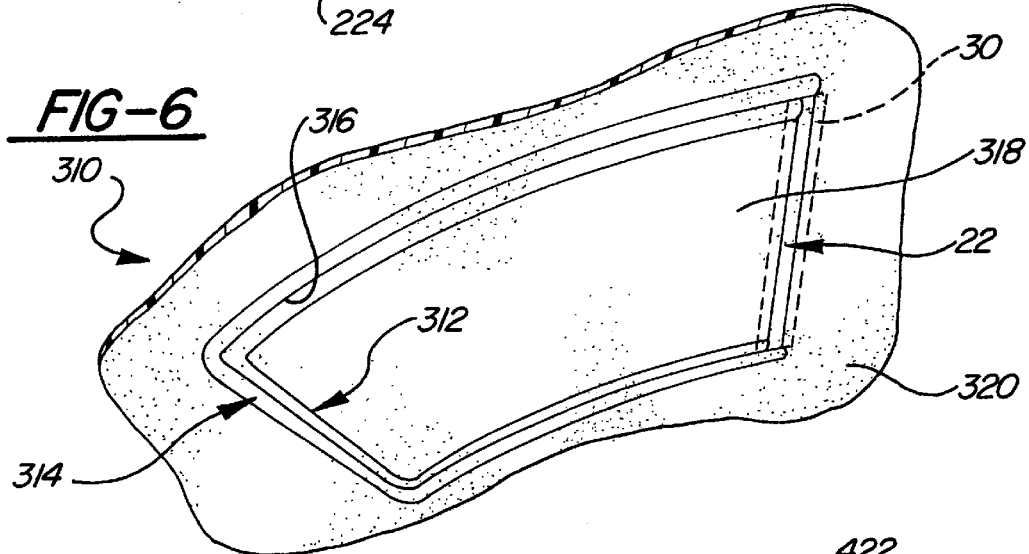
FIG. 6 is a partial perspective bottom view of the integral air bag door and instrument panel of FIG. 3.
Figure 7:
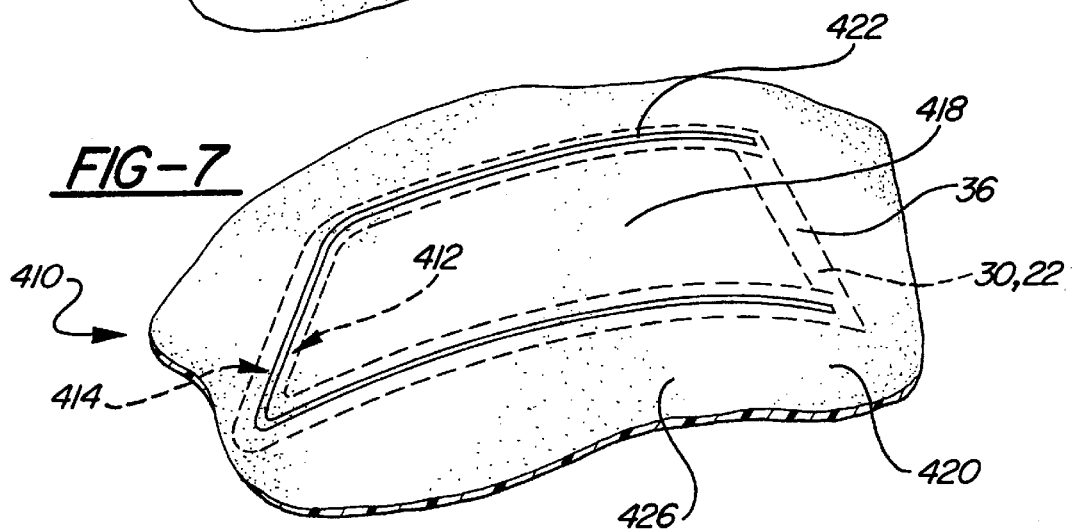
FIG. 7 is a partial perspective top view of the integral air bag door and instrument panel of FIG. 4.

As shown in FIGS. 3 and 6, the second embodiment 310 of the invention includes two tubular channels 312, 314. The tubular channels 312, 314 are disposed adjacent and parallel to each other. The channels 312, 314 run astride and define an elongated gap or seam 316 that defines an integral air bag door 318 in an instrument panel retainer 320. The seam 316 also serves as a tear guide between the two tubular channels 312, 314. As shown in FIG. 3, a skin layer 40 may supported on the trim panel retainer 320 and a foam layer 42 may be disposed between the trim panel retainer 320 and the skin layer 40.

As shown in FIG. 4, the third embodiment 410 of the invention includes two tubular channels 412, 414. The tubular channels 412, 414 are disposed adjacent and parallel to each other. The channels 412, 414 run along either side of and define an elongated gap or seam 416 that defines an integral air bag door 418 in an instrument panel retainer 420. The seam 416 also serves as a tear guide between the two tubular channels 412, 414. Unlike the third embodiment 310, the fourth embodiment 410 also includes an elongated groove, shown at 422 in FIGS. 4 and 7, disposed in the outer class-A surface 426 opposite the elongated gap 416. The elongated groove 422 further reduces the thickness of the plastic material where concealment of the inflatable restraint system 410 is not a concern.

As shown in FIG. 8, the fourth embodiment 510 of the invention includes two tubular gas channels 512, 514 disposed along either side of an embedded hinge panel 524. Similar to the third embodiment 410, the fourth embodiment 510 includes an elongated groove 522 disposed in the outer class-A surface 526. In the fourth embodiment 510 the reduction in thickness provided by the groove 522 reduces resistance to bending of the hinge 522. The tubular channels 512, 514 help to reduce the possibility of hinge failure by adding structural stiffness on either side of the hinge panel to insure that bending takes place in the hinge panel 524.

In practice, the hinge 22 of the inflatable restraint assembly may be constructed by first providing a mold configured to form the shape of the integral air bag door 12 and instrument panel 14. A sheet of the second material is then be placed in the mold in a position spanning a region of the mold configured to form the door seam 20. The first material 16 is then introduced in molten form into the mold such that the sheet of the second material is at least partially embedded in the first material 16. The first material 16 is then allowed to cure within the mold. Finally, the cured first material 16 and at least partially embedded sheet of the second material are removed from the mold.

The tear seam 18, 316, 416–422 of the inflatable restraint assembly may be constructed according to the present invention by first providing a mold configured to form the shape of the integral air bag door 12, 318, 418 and instrument panel 14, 320, 420 and the tubular channel 214 or channels 312, 314; 412, 414. Resin is then injected into the mold. Gas is then injected into a portion of the resin disposed in a portion of the mold configured to form the tubular channel 214 or channels 312, 314; 412, 414. As the gas is injected it forms the gas channel tube(s) 216 and helps propel resin into narrow mold regions along the tear seam 18, 316, 416–422. The resin is then allowed to cure within the mold before it is removed. The use of gas channels to form tear seams has the advantage of providing relatively large tear-guide structures without using large amounts of material to create thick regions that would result in sink formation. If large amounts of material were used to thicken the panel on either side of the desired tear seam, shrinkage during curing would result in surface discontinuities in the form of depressions or "sinks".

The description and drawings illustratively set forth invention embodiments that we presently prefer. We intend the description and drawings to describe these embodiments rather than to limit the scope of the invention. Obviously, it is possible to modify these embodiments while remaining within the scope of the following claims. Therefore, within the scope of the claims, one may practice the invention otherwise than as the description and drawings specifically show and describe.

We claim:

1. An inflatable restraint assembly for passengers in automotive vehicles, the assembly comprising:

an air bag door integrally formed in an automotive trim panel of a first material, the integral air bag door defined at least in part by a tear guide in a closed position;

the air bag door movable from the closed position to provide a path for an air bag to deploy through, the air bag door being movable out of the closed position by at least partially separating from the trim panel along a door seam at least partially defined by the tear guide;

a retaining structure configured to preclude at least a portion of the air bag door from departing the immediate vicinity of the trim panel during air bag deployment;

a hinge comprising a second material embedded at least partially within the first material and spanning the door seam;

a first end of the hinge embedded in a portion of the first material that forms the door;

a second end of the hinge embedded in a portion of the first material that forms the trim panel; and a mid portion disposed between the first and second ends, the mid portion having an outer surface covered with a portion of the first material that forms an outer class-A surface of the door and trim panel, the mid portion having an exposed inner surface disposed opposite the outer surface, both outer and inner surfaces of the first and second ends being at least partially covered by the first material to more positively secure the first and second ends in the door and trim panel, respectively.

2. An inflatable restraint assembly as defined in claim 1 in which the hinge is at least substantially invisible on the outer class-A surface of the trim panel.

3. An inflatable restraint assembly for passengers in automotive vehicles, the assembly comprising:

an air bag door integrally formed in an automotive trim panel of a first material, the integral air bag door defined at least in part by a tear guide in a closed position;

the air bag door movable from the closed position to provide a path for an air bag to deploy through, the air bag door being movable out of the closed position by at least partially separating from the trim panel along a door seam at least partially defined by the tear guide;

a retaining structure configured to preclude at least a portion of the air bag door from departing the immediate vicinity of the trim panel during air bag deployment;

a hinge comprising a second material embedded at least partially within the first material and spanning the door seam;

the trim panel including a first tubular channel disposed along one side of the hinge and a second tubular channel disposed generally parallel to the first tubular channel and along a side of the hinge opposite the first tubular channel.

4. An inflatable restraint assembly for passengers in automotive vehicles, the assembly comprising:

an air bag door integrally formed in an automotive trim panel of a first material, the integral air bag door defined at least in part by a tear guide in a closed position;

the air bag door movable from the closed position to provide a path for an air bag to deploy through, the air bag door being movable out of the closed position by at least partially separating from the trim panel along a door seam at least partially defined by the tear guide;

a retaining structure configured to preclude at least a portion of the air bag door from departing the immediate vicinity of the trim panel during air bag deployment;

a hinge comprising a second material embedded at least partially within the first material and spanning the door seam, a first end of the hinge embedded in a portion of the first material that forms the door, a second end of the hinge embedded in a portion of the first material that forms the trim panel such that both outer and inner surfaces of the first and second ends are at least partially covered by the first material; and the trim panel including a first tubular channel disposed along one side of the hinge.

5. An inflatable restraint assembly as defined in claim 4 in which the trim panel includes an elongated groove disposed adjacent and generally parallel to the tubular channel.

6. An inflatable restraint assembly as defined in claim 4 in which:

the tear guide comprises a region of reduced strength in the trim panel that guides tearing during air bag deployment; and a first generally tubular channel is integrally formed in the trim panel along the tear guide to create a strength differential with the door seam.

7. An inflatable restraint assembly as defined in claim 6 in which the first generally tubular channel includes an elongated arcuate outer wall.

8. An inflatable restraint assembly as defined in claim 6 in which the tear guide comprises a region of reduced thickness.

9. An inflatable restraint assembly as defined in claim 6 in which the first tubular channel is disposed opposite an outer class-A surface of the air bag door and trim panel.

10. An inflatable restraint assembly as defined in claim 6 further including:

a first generally tubular channel disposed along the tear guide; and a second generally tubular channel disposed adjacent and parallel to the first tubular channel, the tear guide being disposed between the first and second tubular channels.

11. An inflatable restraint assembly as defined in claim 10 in which the tear guide is defined by an elongated gap disposed between the first and second tubular channels.

12. An inflatable restraint assembly as defined in claim 11 further including an elongated groove disposed in an outer class-A surface of the air bag door and trim panel in a position opposite the elongated gap.

* * * * *